(12) United States Patent
Chen

(10) Patent No.: US 11,994,792 B2
(45) Date of Patent: May 28, 2024

(54) WAVELENGTH CONVERSION ELEMENT AND PROJECTION DEVICE WITH FLOW GUIDING STRUCTURES

(71) Applicant: Coretronic Corporation, Hsin-Chu (TW)

(72) Inventor: Chih-Ming Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 37 days.

(21) Appl. No.: 17/834,961

(22) Filed: Jun. 8, 2022

(65) Prior Publication Data
US 2022/0413372 A1    Dec. 29, 2022

(30) Foreign Application Priority Data
Jun. 25, 2021    (CN) .......................... 202121424129.7

(51) Int. Cl.
*G03B 21/16*    (2006.01)
*G03B 21/20*    (2006.01)

(52) U.S. Cl.
CPC ........... *G03B 21/204* (2013.01); *G03B 21/16* (2013.01)

(58) Field of Classification Search
CPC ............................... G03B 21/204; G03B 21/16
See application file for complete search history.

(56) References Cited

U.S. PATENT DOCUMENTS

| | | | | |
|---|---|---|---|---|
| 2013/0169938 A1* | 7/2013 | Huang | .................. | G03B 21/204 353/31 |
| 2017/0175989 A1* | 6/2017 | Yamagishi | ............. | G03B 21/16 |
| 2017/0205692 A1* | 7/2017 | Aoki | ....................... | G03B 21/16 |
| 2017/0261844 A1* | 9/2017 | Kitade | .................. | H04N 9/3158 |
| 2018/0031207 A1* | 2/2018 | Chang | ........................ | F21V 9/30 |
| 2018/0088317 A1* | 3/2018 | Yoshikawa | .............. | G02B 5/20 |
| 2018/0224731 A1* | 8/2018 | Yoshikawa | .......... | G02B 26/008 |
| 2018/0321574 A1* | 11/2018 | Chang | .................... | G03B 21/16 |
| 2019/0094671 A1* | 3/2019 | Ikeo | ....................... | G02B 26/008 |
| 2019/0353993 A1* | 11/2019 | Ikeo | .......................... | F21S 2/00 |
| 2020/0225462 A1* | 7/2020 | Hsu | ....................... | H04N 9/3158 |
| 2021/0286165 A1* | 9/2021 | Asano | ...................... | H04N 5/74 |
| 2022/0019137 A1* | 1/2022 | Chen | .................... | G03B 21/204 |
| 2022/0260241 A1* | 8/2022 | Iizawa | .................. | F21V 29/502 |

FOREIGN PATENT DOCUMENTS

| | | |
|---|---|---|
| CN | 103328885 B | 3/2016 |
| CN | 107678235 A | 2/2018 |
| CN | 109782429 A | 5/2019 |
| CN | 212302196 U | 1/2021 |
| CN | 214540361 U | 10/2021 |

* cited by examiner

*Primary Examiner* — Bao-Luan Q Le

(57) ABSTRACT

A wavelength conversion element includes a substrate, a wavelength conversion layer and a fixed ring. The fixed ring has a first surface, a second surface, and a plurality of flow guiding structures. The second surface has a first region and a second region. The plurality of flow guiding structures is located on the first surface, and each of the plurality of flow guiding structures is formed with a first flow guiding hole. The first flow guiding hole extends from the first surface to the second region of the second surface. The plurality of flow guiding structures respectively have a spoiler surface, the spoiler surface stands on the first surface and has a second flow guiding hole, in which the second flow guiding hole and the first flow guiding hole of each of the plurality of flow guiding structures face different directions. A projection device of the invention is further provided.

14 Claims, 8 Drawing Sheets

WAVELENGTH CONVERSION ELEMENT AND PROJECTION DEVICE WITH FLOW GUIDING STRUCTURES

CROSS-REFERENCE TO RELATED APPLICATION

This application claims the priority benefit of China application 202121424129.7, filed on 2021 Jun. 25. The entirety of the above-mentioned patent application is hereby incorporated by reference herein and made a part of this specification.

FIELD OF THE INVENTION

The invention relates to a wavelength conversion element, and more particularly to a wavelength conversion element having a fixed ring with a flow guiding structure, and a projection device with the wavelength conversion element.

BACKGROUND OF THE INVENTION

The type of light source used in the projection device has evolved from ultra-high pressure mercury lamp (UHP lamp), light emitting diode (LED) to laser diode (LD) with the market demand for brightness, color saturation, service life, non-toxic environmental protection and the like of the projection device.

Generally speaking, a projection device disposed with a laser diode would use a fluorescent color wheel to convert the excitation light beam provided by the laser diode into a converted light beam. The existing fluorescent color wheel mainly includes a substrate, a phosphor layer, a motor, a fixed ring, and counterweight glue. The fixed ring presses the substrate against the motor, the fluorescent layer is disposed on the substrate, and the counterweight glue is disposed on the fixed ring. When the projection device is in operation, the temperature of the phosphor layer will rise due to continuous exposure to the excitation light beam. Therefore, in order to dissipate heat from the phosphor layer, the substrate is usually made of a material with better thermal conductivity.

However, due to the limited heat dissipation capacity of the substrate, the existing fluorescent color wheel still has the problem of poor heat dissipation efficiency. When the heat dissipation efficiency of the fluorescent color wheel is not good, the counterweight glue would easily crack and fall off due to high temperature, thus affecting the durability of the projection device.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a wavelength conversion element to improve heat dissipation efficiency.

The invention provides a projection device with good durability.

Other advantages and objects of the invention may be further illustrated by the technical features broadly embodied and described as follows.

In order to achieve one or a portion of or all of the objects or other objects, a wavelength conversion element provided in an embodiment of the invention includes a substrate, a wavelength conversion layer and a fixed ring. The wavelength conversion layer is disposed on the substrate. The fixed ring is disposed on the substrate. The fixed ring has a first surface, a second surface, and a plurality of flow guiding structures. The first surface is opposite to the second surface. The second surface faces the substrate. The second surface has a first region and a second region adjacent to the first region. The first region is fixed to the substrate. The second region is separated from the substrate to form a flow guiding space, in which the plurality of flow guiding structures is located on the first surface. Each of the plurality of flow guiding structures is formed with a first flow guiding hole. The plurality of first flow guiding holes extends from the first surface to the second region of the second surface. The plurality of flow guiding structures respectively have a spoiler surface, the spoiler surface stands on the first surface and has a second flow guiding hole, in which the second flow guiding hole and the first flow guiding hole of each of the plurality of flow guiding structures face different directions.

In order to achieve one or a portion of or all of the objects or other objects, a projection device provided in an embodiment of the invention includes an illumination system, a light valve and a projection lens. The illumination system is adapted to provide an illumination light beam. The light valve is disposed on a transmission path of the illumination light beam to convert the illumination light beam into an image light beam. The projection lens is disposed on a transmission path of the image light beam to project the image light beam. The illumination system includes an excitation light source and the wavelength conversion element described above. The excitation light source is adapted to provide an excitation light beam.

The wavelength conversion element of the invention uses a fixed ring having a plurality of flow guiding structures, and each of the plurality of flow guiding structures has a first flow guiding hole and a spoiler surface. Since the spoiler surface stands on the substrate and has a second flow guiding hole, when the wavelength conversion element rotates, the airflow would flow through the flow guiding space between the substrate and the fixed ring by the second flow guiding hole and the first flow guiding hole to take away the heat energy of the fixed ring and the substrate accumulated around the flow guiding space, thereby improving the heat dissipation efficiency of the wavelength conversion element. Since the projection device of the invention uses the above-mentioned wavelength conversion element, it may have good durability.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
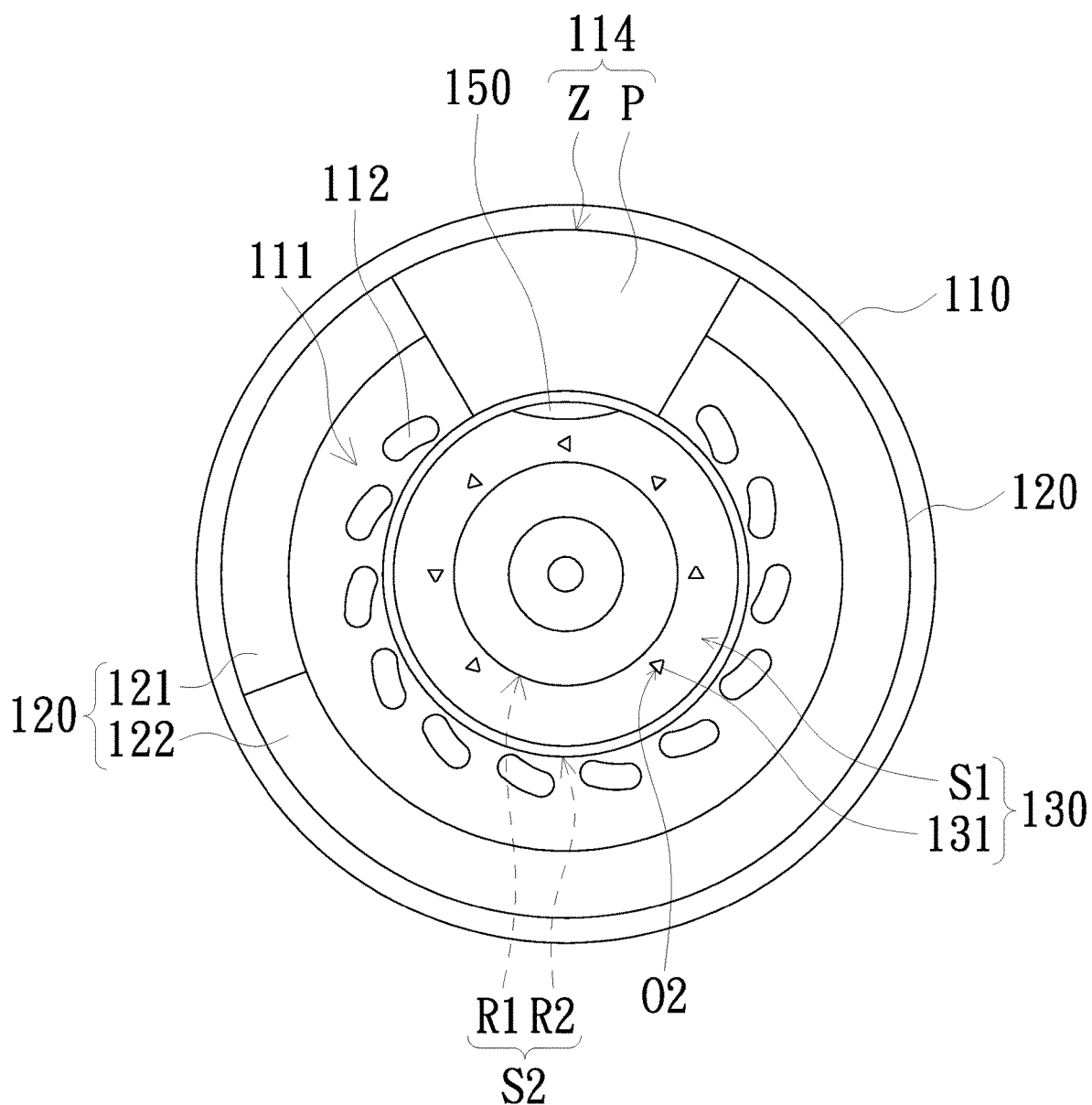
FIG. 1 is a schematic top view of a wavelength conversion element of one embodiment of the invention.
Figure 2:
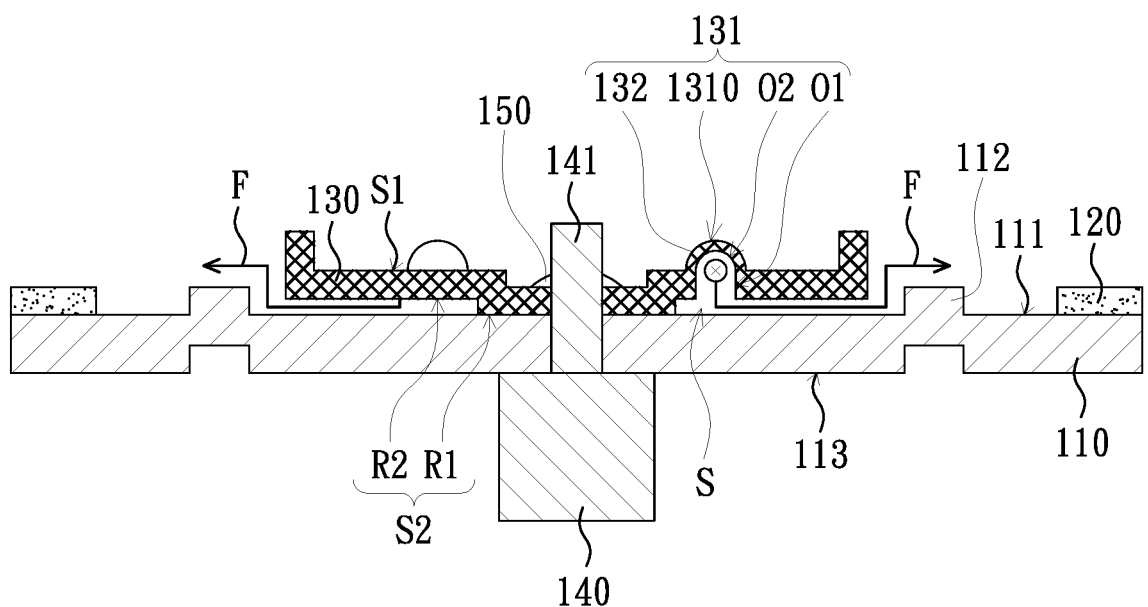
FIG. 2 is a cross-sectional schematic diagram of the wavelength conversion element of FIG. 1.
Figure 3:
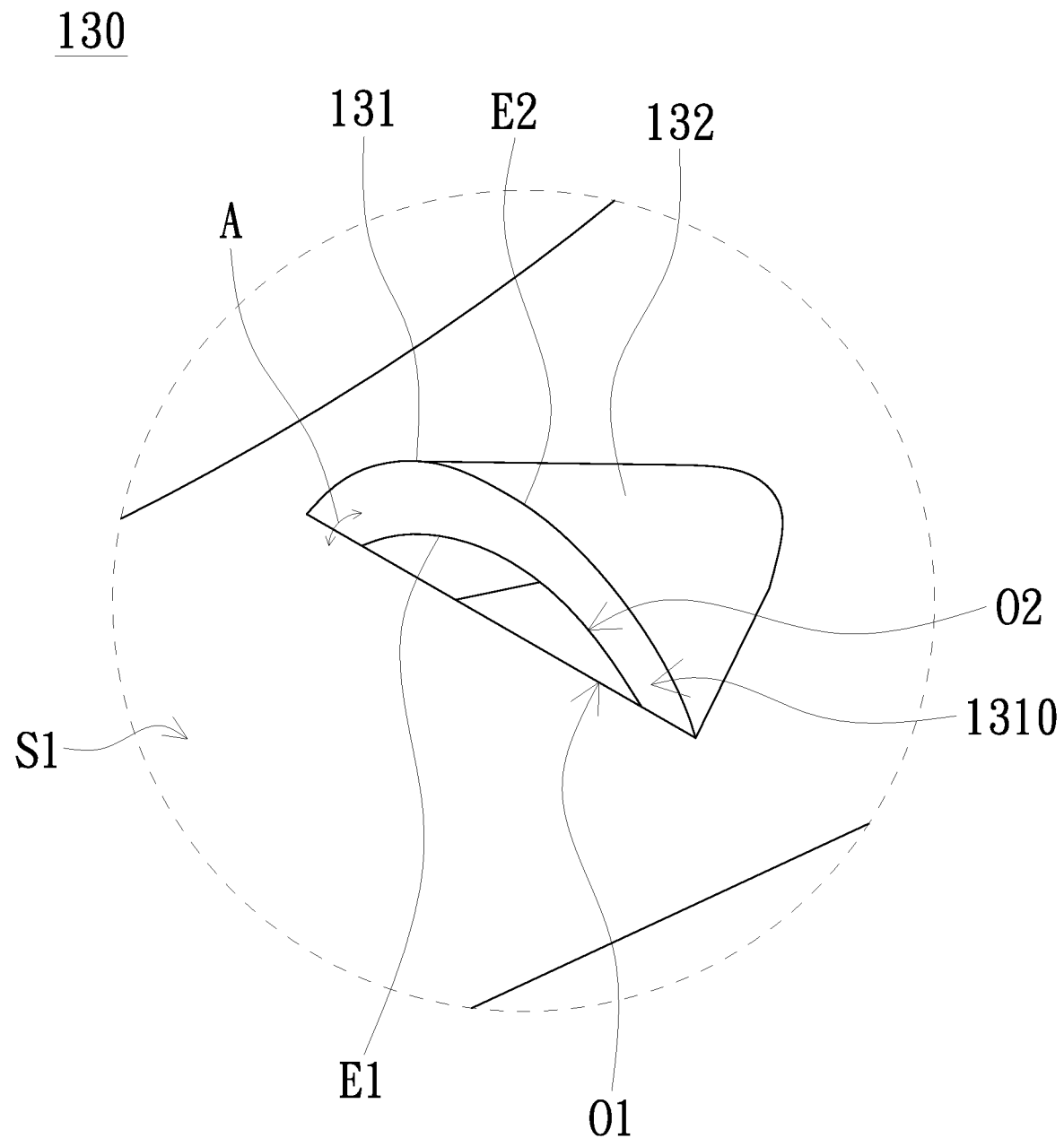
FIG. 3 is a three-dimensional schematic diagram of the flow guiding structure in FIG. 1.
Figure 8:
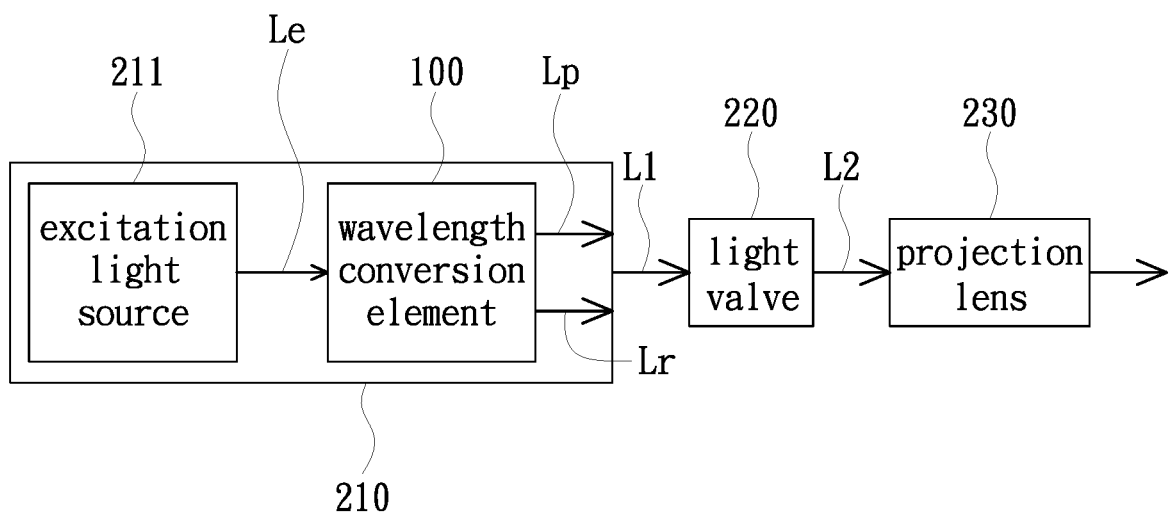
FIG. 8 is a block diagram of a projection device of one embodiment of the invention.

FIG. 1 is a schematic top view of a wavelength conversion element of one embodiment of the invention. FIG. 2 is a cross-sectional schematic diagram of the wavelength conversion element of FIG. 1. FIG. 3 is a three-dimensional schematic diagram of the flow guiding structure in FIG. 1. Referring to FIG. 1 to FIG. 3, the wavelength conversion element 100 includes a substrate 110, a wavelength conversion layer 120 and a fixed ring 130. The wavelength conversion layer 120 is disposed on the substrate 110 for receiving the excitation light beam Le (as shown in FIG. 8). The fixed ring 130 is disposed on the substrate 110. The fixed ring 130 has a first surface S1, a second surface S2, and a plurality of flow guiding structures 131. The first surface S1 is opposite to the second surface S2, and the second surface S2 faces the substrate 110. The second surface S2 has a first region R1 and a second region R2 adjacent to the first region R1. The first region R1 is fixed to the substrate 110. The second region R2 is separated from the substrate 110 to form a flow guiding space S (drawn in FIG. 2). The plurality of flow guiding structures 131 is located on the first surface S1, and each of the plurality of flow guiding structures 131 is formed with a first flow guiding hole O1. The first flow guiding hole O1 extends from the first surface S1 to the second region R2 of the second surface S2. The plurality of flow guiding structures 131 respectively have a spoiler surface 1310, and the spoiler surface 1310 stands on the first surface S1 and has a second flow guiding hole O2, wherein the second flow guiding hole O2 and the first flow guiding hole O1 of each of the plurality of flow guiding structures 131 face different directions.

The substrate 110 may have a bearing surface 111 on which the wavelength conversion layer 120 is disposed. The material of the substrate 110 may include metal (for example, aluminum, copper, silver) or other materials with high temperature resistance and high thermal conductivity (for example, ceramics), but is not limited thereto. In addition, the substrate 110 may also have a plurality of heat dissipation structures 112 to further enhance the heat dissipation efficiency of the substrate 110. In detail, the heat dissipation structures 112 of the embodiment surround the fixed ring 130, but are not limited thereto. The heat dissipation structures 112 may be formed by stamping or may be a boss formed by coating glue, but is not limited thereto. Preferably, a radial distance between the heat dissipation structure 112 and a center of a turntable is greater than a radial distance between the flow guiding structure 131 and the center of the turntable. In addition, the heat dissipation structures 112 of the embodiment, for example, protrude from the bearing surface 111, but the heat dissipation structures 112 of other embodiments may also be recessed in the bearing surface 111. The invention does not limit the details of the shape, quantity, and specific location of the heat dissipation structures 112.

The wavelength conversion layer 120 is used to convert the wavelength of the excitation light beam. In detail, continue to refer to FIG. 1, the wavelength conversion layer 120 of the embodiment may include two wavelength conversion blocks 121 and 122. The wavelength conversion block 121 may emit green light after being irradiated by the excitation light beam, and the wavelength conversion block 122 may emit yellow light after being irradiated by the excitation light beam, but are not limited thereto. For example, in one embodiment, the quantity of the wavelength conversion blocks may be three, and the three wavelength conversion blocks may respectively emit green light, yellow light, and red light after being irradiated by the excitation light beam. In another embodiment, the quantity of the above-mentioned wavelength conversion block may be one, and the wavelength conversion block may emit yellow light after being irradiated by the excitation light beam. It can be understood that, in other embodiments, the quantity of wavelength conversion blocks may also be more than three. In the embodiment, the wavelength conversion layer 120 may include a wavelength conversion material, and the wavelength conversion material may include, for example, fluorescent materials, phosphorescent materials (for example, phosphors), or nanomaterials (for example, quantum dots), but is not limited thereto.

In addition, the substrate 110 may also have a wavelength maintaining region 114. The wavelength maintaining region 114 is, for example, an opening hole Z of the substrate 110 and a plate P is provided. A shape of the plate P may correspond to the shape of the wavelength maintaining region 114, for example, the plate P may be embedded in the wavelength maintaining region 114. The plate P of the embodiment is, for example, a light-transmitting plate for the excitation light beam to pass through, and a light diffusion layer or a light diffusion microstructure may be provided on the light-transmitting plate to eliminate laser speckles formed by the excitation light beam. In addition, because the wavelength maintaining region 114 is the opening hole Z, it may also be provided for the excitation light beam to directly pass through without the plate P or other optical elements. In one embodiment, the plate P may be a reflective plate to reflect the excitation light beam. In another embodiment, the wavelength maintaining region 114 may also be a part of the bearing surface 111 or a reflective layer disposed on the bearing surface 111 to reflect the excitation light beam.

Referring to FIG. 2 again, the fixed ring 130 of the embodiment is, for example, disposed on the bearing surface 111 of the substrate 110. In the embodiment, the wavelength conversion element 100 is, for example, a wavelength conversion wheel. Therefore, the wavelength conversion element 100 may further include a motor 140, and the motor 140 may include a rotating shaft 141. In detail, the motor 140 may be disposed on the other side of the fixed ring 130 opposite to the substrate 110. For example, the substrate 110 may also have a back surface 113 opposite to the bearing surface 111, in which the motor 140 may be disposed on the back surface 113, and the fixed ring 130 may be disposed on the bearing surface 111 and sleeved on the rotating shaft 141. In this way, the fixed ring 130 may clamp the substrate 110 with the motor 140, so that the substrate 110 may be stably rotated on the motor 140. Referring to FIG. 1 and FIG. 2 together, a shape of the substrate 110 may be circular for rotation. In order to decrease the initial amount of unbalance of the wavelength conversion element 100, the wavelength conversion element 100 of the embodiment may further include a counterweight 150. The counterweight 150 may be disposed on the fixed ring 130. In the embodiment, a material of the counterweight 150 may include UV glue, but other embodiments are not limited thereto. It can be understood that the wavelength conversion element 100 of other embodiments may not be provided with the counterweight 150.

In the fixed ring 130 of the embodiment, the second region R2 surrounds the first region R1, and an orthographic projection of each of the plurality of flow guiding structures 131 on the second surface S2 is located in the second region R2, so that the first flow guiding hole O1 and the second flow guiding hole O2 may communicate with the flow guiding space S. Therefore, when the wavelength conversion element 100 is rotating, the airflow F (marked in FIG. 2) may flow through the flow guiding space S by the first flow guiding hole O1 and the second flow guiding hole O2 to take away the heat energy of the fixed ring 130 and the substrate 110 accumulated around the flow guiding space S, thereby improving the heat dissipation efficiency of the wavelength conversion element 100.

Furthermore, the first region R1 may protrude toward the substrate 110 and be fixed to the substrate 110. For example, the first region R1 of the embodiment protrudes toward the bearing surface 111 and is fixed to the bearing surface 111. The flow guiding space S, for example, continuously surrounds the first region R1. That is, no element may be provided in the flow guiding space S to avoid partitioning the flow guiding space S, so as to increase the space where the airflow F flows, thereby further improving the heat dissipation efficiency. On the other hand, the first flow guiding hole O1 is, for example, adjacent to the first region R1, which may further increase the flow range of the airflow F in the flow guiding space S, so as to further improve the heat dissipation efficiency. In addition, because each of the plurality of the first flow guiding holes O1 may be adjacent to the first region R1, there is more space for the counterweight 150 to dispose in the portion of the first surface S1 that overlaps the second region R2. By the way, an opening direction of the second flow guiding hole O2 may be changed according to a rotation direction of the wavelength conversion element 100, and is not limited to that shown in the figure.

Figure 4:
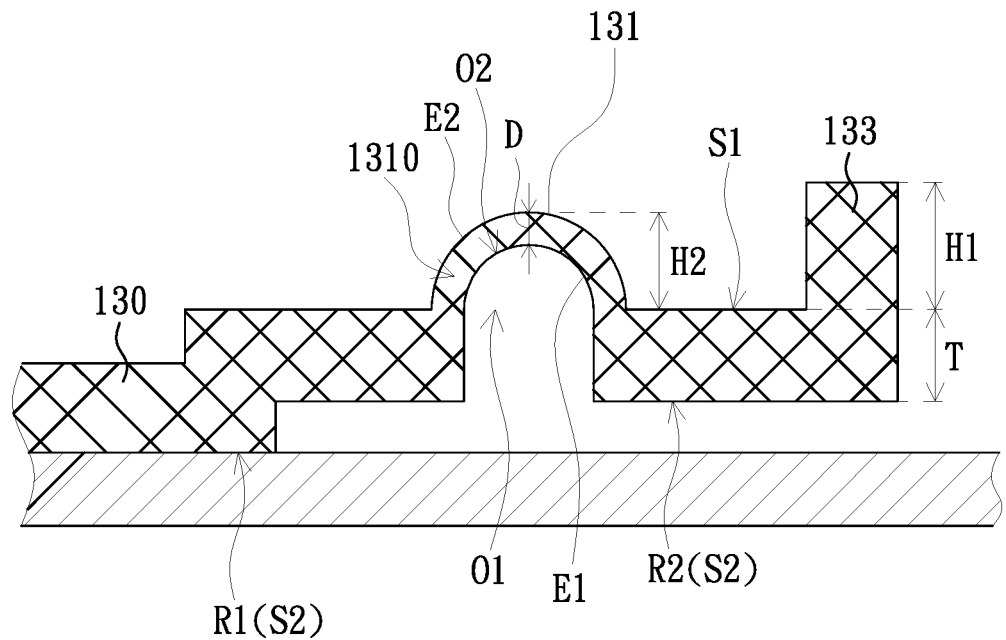
FIG. 4 is an enlarged schematic diagram of the flow guiding structure in FIG. 2.

Referring to FIG. 2 and FIG. 3 again, a material of the fixed ring 130 includes, for example, metal, but is not limited thereto. In the embodiment, the flow guiding structures 131 are formed by stamping the second region R2 of the second surface S2, for example, but the specific shape of the flow guiding structures 131 are not limited to that shown in the figure. In detail, each of the plurality of flow guiding structures 131 may also have a flow guiding wall 132, and the flow guiding wall 132, the first flow guiding hole O1, and the second flow guiding hole O2 may be formed together by stamping. In addition, the flow guiding walls 132 protrude from the first surface S1 and respectively cover the first flow guiding holes O1 to prevent the airflow F flowing into the second flow guiding holes O2 from escaping in a direction away from the first surface S1, thereby further increasing the amount of airflow flowing into the flow guiding structures 131. In addition, referring to FIG. 3 and FIG. 4 together, the fixed ring 130 may have a thickness T between the first surface S1 and the second region R2 of the second surface S2 (as shown in FIG. 4). The spoiler surface 1310 may have an inner edge E1 adjacent to the second flow guiding hole O2 and an outer edge E2 away from the second flow guiding hole O2. A distance D (marked in FIG. 4) between the outer edge E2 and the inner edge E1 is smaller than the thickness T, for example. In this way, the cross-sectional area of the opening of the second flow guiding hole O2 may be increased to further increase the amount of airflow flowing into the flow guiding structures 131. The above-mentioned stamping and forming processing method may increase the cross-sectional area of the opening of the second flow guiding hole O2, but the invention does not limit the specific processing method. In addition, in order to increase the spoiler effect of the spoiler surface 1310 and increase the amount of airflow flowing into the flow guiding structures 131, an angle A (marked in FIG. 3) between the spoiler surface 1310 and the first surface S1 is, for example, between 85° and 95°. For example, the angle A of the embodiment is about 90°, but the invention is not limited thereto. By the way, continue to refer to FIG. 4, the outer edge of the fixed ring 130 may have an annular side wall 133 standing on the first surface S1. A height H1 of the annular side wall 133 relative to the first surface S1 is greater than a height H2 of each of the plurality of flow guiding structures 131 relative to the first surface S1, which may reduce the noise generated by the flow guiding structures 131 when the wavelength conversion element 100 rotates.

Compared with the prior art, the wavelength conversion element 100 of the embodiment uses a fixed ring 130 having a plurality of flow guiding structures 131, and each of the plurality of flow guiding structures 131 has a first flow guiding hole O1 and a spoiler surface 1310. In detail, because the spoiler surface 1310 stands on the substrate 110 and has a second flow guiding hole O2, not only the spoiler surface 1310 may produce a spoiler effect to increase the heat dissipation efficiency of the wavelength conversion element 100, but also the second flow guiding hole O2 may provide a large amount of airflow F to flow into the flow guiding structures 131. Furthermore, because the spoiler surface 1310 stands on the substrate 110 and has a second flow guiding hole O2, when the wavelength conversion element 100 rotates, the airflow F would flow through the flow guiding space S between the substrate 110 and the fixed ring 130 by the second flow guiding hole O2 and the first flow guiding hole O1 to take away the heat energy of the fixed ring 130 and the substrate 110 accumulated around the flow guiding space S, thereby improving the heat dissipation efficiency of the wavelength conversion element 100.

Figure 5:
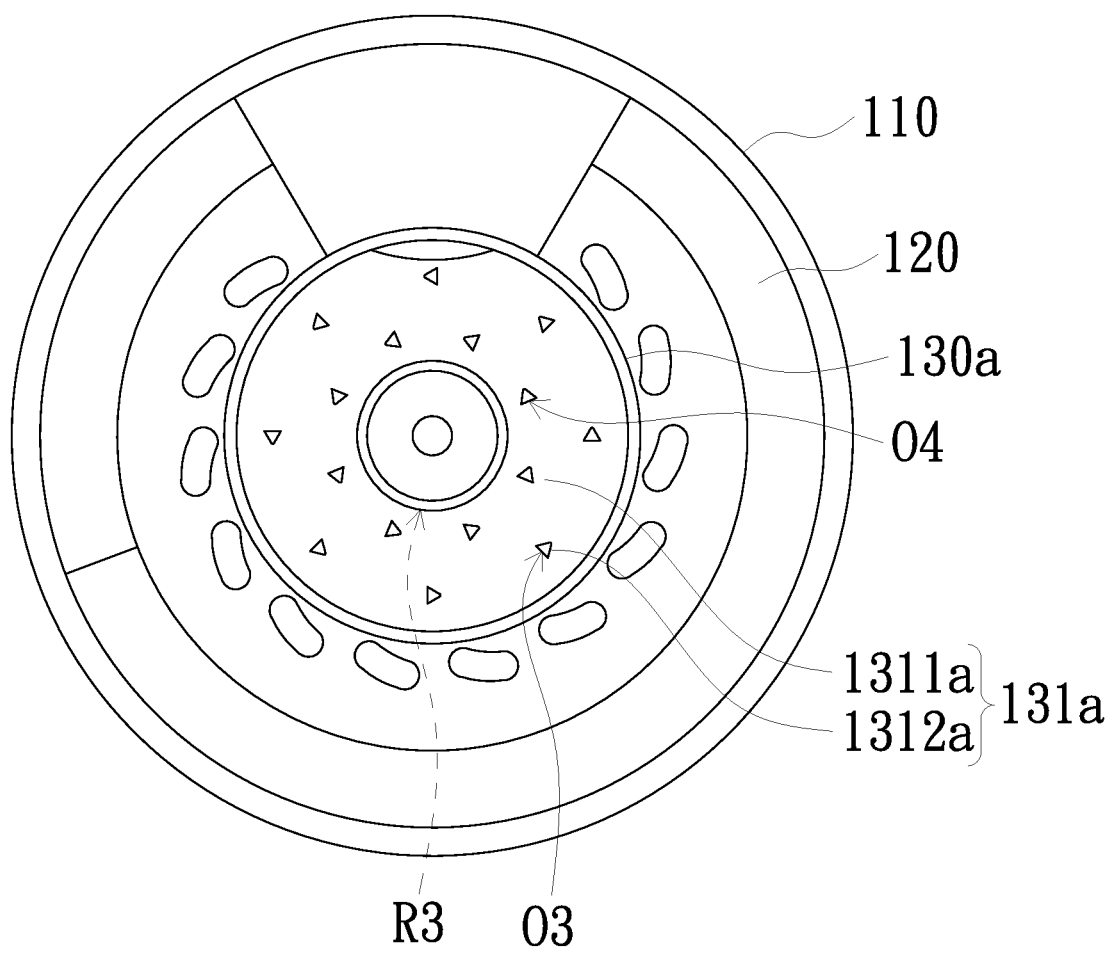
FIG. 5 is a schematic top view of a wavelength conversion element of another embodiment of the invention.

FIG. 5 is a schematic top view of a wavelength conversion element of another embodiment of the invention. The structure and advantages of the wavelength conversion element 100a of the embodiment are similar to those in the embodiment of FIG. 1, and only the differences are described below. Referring to FIG. 5, the flow guiding structures 131a of the fixed ring 130a in the embodiment is, for example, arranged in a plurality of circles. For example, the flow guiding structure 131a includes a plurality of first flow guiding structures 1311a and a plurality of second flow guiding structures 1312a. The plurality of first flow guiding structures 1311a is arranged around the first region R3, and the plurality of second flow guiding structures 1312a is arranged around the plurality of first flow guiding structures 1311a to further improve the heat dissipation efficiency of the wavelength conversion element 100a. It can be understood that the detailed structures of the first flow guiding structure 1311a and the second flow guiding structure 1312a may be different from each other. For example, the second flow guiding hole O3 of the first flow guiding structure 1311a may be slightly larger than the second flow guiding hole O4 of the second flow guiding structure 1312a, so that the amount of airflow flowing into the first flow guiding structure 1311a and the amount of airflow flowing into the second flow guiding structure 1312a may be substantially the same. In this way, the wavelength conversion element 100a may dissipate heat more uniformly. By the way, in other embodiments, the fixed ring 130a may also include a third flow guiding structure surrounding the second flow guiding structure 1312a, and the invention does not limit the specific arrangement of the flow guiding structure 131a.

Figure 6:
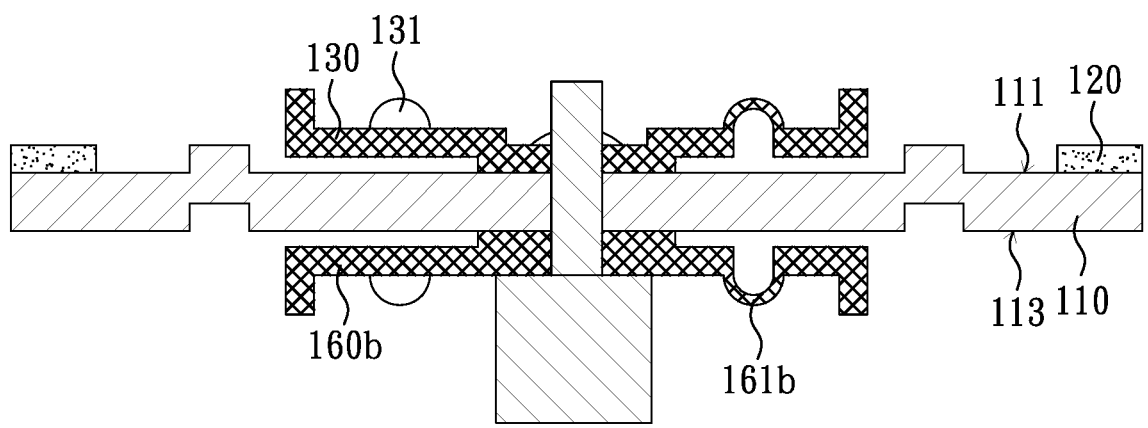
FIG. 6 is a cross-sectional schematic diagram of a wavelength conversion element of another embodiment of the invention.

FIG. 6 is a cross-sectional schematic diagram of a wavelength conversion element of another embodiment of the invention. Referring to FIG. 6, the wavelength conversion element 100b may further include a back surface fixed ring 160b. The back surface fixed ring 160b and the fixed ring 130 are disposed on opposite sides of the substrate 110. For example, the fixed ring 130 of the embodiment is disposed on the bearing surface 111, and the back surface fixed ring 160b is disposed on the back surface 113. In addition, a plurality of flow guiding structures 161b may also be formed on the back surface fixed ring 160b to further improve the heat dissipation efficiency of the wavelength conversion element 100b. The structure and advantages of the back surface fixed ring 160b may be similar to those of the above-mentioned fixed ring 130 or 130a, so the relevant features would not be repeated herein.

Figure 7:
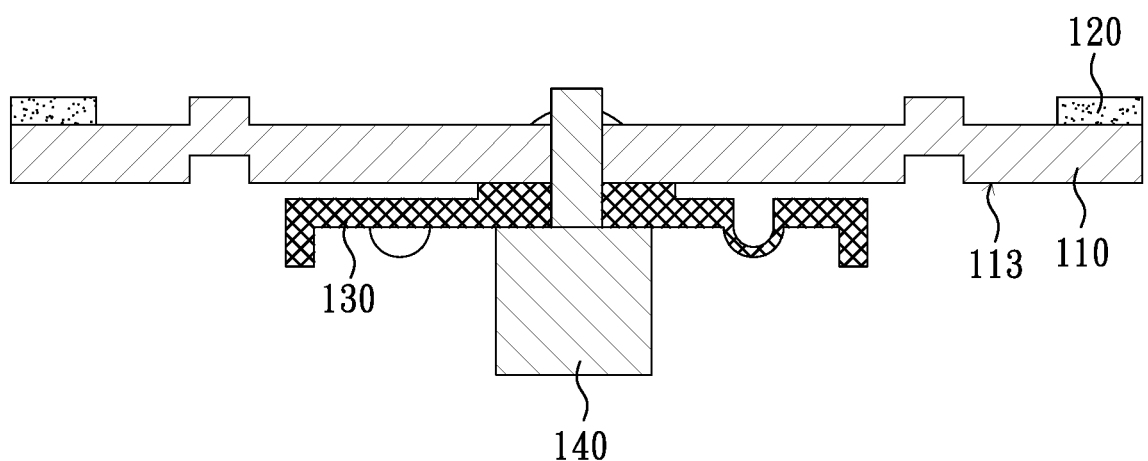
FIG. 7 is a cross-sectional schematic diagram of a wavelength conversion element of another embodiment of the invention.

FIG. 7 is a cross-sectional schematic diagram of a wavelength conversion element of another embodiment of the invention. The structure and advantages of the wavelength conversion element 100c of the embodiment are similar to those in the embodiment of FIG. 1, and the main difference is that the motor 140 of the embodiment may be disposed on the same side of the fixed ring 130 opposite to the substrate 110. For example, the fixed ring 130 may be disposed on the back surface 113 of the substrate 110. The motor 140 may be disposed on the same side as the fixed ring 130.

FIG. 8 is a block diagram of a projection device of one embodiment of the invention. Referring to FIG. 8, the projection device 200 includes an illumination system 210, a light valve 220, and a projection lens 230. The illumination system 210 is adapted to provide an illumination light beam L1. The light valve 220 is disposed on a transmission path of the illumination light beam L1 to convert the illumination light beam L1 into an image light beam L2. The projection lens 230 is disposed on a transmission path of the image light beam L2 to project the image light beam L2. The illumination system 210 includes an excitation light source 211 and the wavelength conversion element 100. The excitation light source 211 is adapted to provide an excitation light beam Le. In other embodiments, the wavelength conversion element 100 may also be replaced with the wavelength conversion element 100a, 100b or 100c.

In the embodiment, the illumination system 210 may include the excitation light source 211 and the wavelength conversion element 100. The excitation light source 211 includes, for example, a light emitting diode (LED) or a laser diode (LD), in which the quantity of the light emitting diode or the laser diode may be one or more. For example, when the quantity of the light emitting diodes (or laser diodes) is multiple, the light emitting diodes (or laser diodes) may be arranged in a matrix. The wavelength conversion element 100 is disposed on the transmission path of the excitation light beam Le, and the wavelength conversion element 100 sequentially converts the excitation light beam Le into the converted light beam Lp. In addition, the excitation light beam Le which is not converted into the converted light beam Lp by the wavelength conversion element 100 is indicated by the light beam Lr. The above-mentioned illumination light beam L1 includes the light beam Lr and the converted light beam Lp. Since the features of the wavelength conversion element 100 have been described in detail in the foregoing, the related description is omitted here.

The light valve 220 is, for example, a digital micromirror device (DMD), a liquid crystal on silicon (LCoS) or a liquid crystal display (LCD), but is not limited thereto. In addition, the embodiment does not limit the quantity of the light valves. For example, the projection device 200 of the embodiment may use a single-chip liquid crystal display panel or a three-chip liquid crystal display panel structure, but it is not limited thereto.

The projection lens 230 includes, for example, one or more optical lenses, and the diopter of the optical lenses may be the same or different from each other. For example, the optical lens may include various non-planar lenses such as biconcave lenses, lenticular lenses, meniscus lenses, convex and concave lenses, plano-convex lenses, and plano-concave lenses, or any combination of the above-mentioned non-planar lenses. On the other hand, the projection lens 230 may also include a planar optical lens. The invention does not limit the specific structure of the projection lens 230.

Compared with the prior art, the projection device 200 of the embodiment uses the wavelength conversion element 100, and the wavelength conversion element 100 may provide good heat dissipation efficiency, so the projection device 200 of the embodiment may have good durability.

In summary, the wavelength conversion element of the invention uses a fixed ring having a plurality of flow guiding structures, and each of the plurality of flow guiding structures has a first flow guiding hole and a spoiler surface. Because the spoiler surface stands on the substrate and has a second flow guiding hole, when the wavelength conversion element rotates, the airflow would flow through the flow guiding space between the substrate and the fixed ring by the second flow guiding hole and the first flow guiding hole to take away the heat energy of the fixed ring and the substrate accumulated around the flow guiding space, thereby improving the heat dissipation efficiency of the wavelength conversion element. Since the projection device of the invention uses the above-mentioned wavelength conversion element, it may have good durability.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first flow guiding structure, the second flow guiding structure, the first flow guiding hole, the second flow guiding hole, the first region, the second region, the first surface and the second surface are only used for distinguishing various elements and do not limit the quantity of the elements.

What is claimed is:

1. A wavelength conversion element, comprising a substrate, a wavelength conversion layer and a fixed ring, wherein:

the wavelength conversion layer is disposed on the substrate, the fixed ring is disposed on the substrate, the fixed ring has a first surface, a second surface, and a plurality of flow guiding structures, the first surface is opposite to the second surface, the second surface faces the substrate, the second surface has a first region and a second region adjacent to the first region, the first region is fixed to the substrate, the second region is separated from the substrate to form a flow guiding space, each of the plurality of flow guiding structures is located on the first surface, each of the plurality of flow guiding structures is formed with a first flow guiding hole, the first flow guiding hole extends from the first surface to the second region of the second surface, each of the plurality of flow guiding structures has a spoiler surface, the spoiler surface protrudes from the first surface and has a second flow guiding hole, wherein the second flow guiding hole and the first flow guiding hole of each of the plurality of flow guiding structures face different directions; and the substrate further has a bearing surface and a back surface opposite to the bearing surface, the wavelength conversion layer is disposed on the bearing surface, and the fixed ring is disposed on the bearing surface.

2. The wavelength conversion element according to claim 1, wherein the second region surrounds the first region, and an orthographic projection of each of the plurality of flow guiding structures on the second surface is located in the second region.

3. The wavelength conversion element according to claim 2, wherein the first region protrudes toward the substrate and is fixed to the substrate, and the flow guiding space continuously surrounds the first region.

4. The wavelength conversion element according to claim 2, wherein the first flow guiding hole is adjacent to the first region.

5. The wavelength conversion element according to claim 2, wherein the plurality of flow guiding structures further comprise a plurality of first flow guiding structures and a plurality of second flow guiding structures, the plurality of first flow guiding structures is arranged around the first region, and the plurality of second flow guiding structures is arranged around the plurality of first flow guiding structures.

6. The wavelength conversion element according to claim 1, wherein an angle between the spoiler surface and the first surface is between 85° and 95°.

7. The wavelength conversion element according to claim 1, wherein the fixed ring has a thickness between the first surface and the second region of the second surface, the spoiler surface has an inner edge adjacent to the second flow guiding hole and an outer edge away from the second flow guiding hole, and a distance between the outer edge and the inner edge is smaller than the thickness.

8. The wavelength conversion element according to claim 1, wherein each of the plurality of flow guiding structures further has a flow guiding wall, and the flow guiding wall protrudes from the first surface and correspondingly covers the first flow guiding hole.

9. The wavelength conversion element according to claim 1, wherein an outer edge of the fixed ring has an annular side wall standing on the first surface, and a height of the annular side wall relative to the first surface is greater than a height of each of the plurality of flow guiding structures relative to the first surface.

10. The wavelength conversion element according to claim 1, wherein the plurality of flow guiding structures are formed by stamping the second region of the second surface.

11. The wavelength conversion element according to claim 1, wherein the substrate further has a plurality of heat dissipation structures, and the plurality of heat dissipation structures surround the fixed ring.

12. The wavelength conversion element according to claim 1, further comprising a motor, wherein a shape of the substrate is circular, and the motor is disposed on the same side or opposite side of the substrate to the fixed ring.

13. The wavelength conversion element according to claim 1, further comprising a back surface fixed ring, wherein the back surface fixed ring and the fixed ring are respectively disposed on two opposite sides of the substrate.

14. A projection device, comprising an illumination system, a light valve and a projection lens, the illumination system being adapted to provide an illumination light beam, the light valve being disposed on a transmission path of the illumination light beam to convert the illumination light beam into an image light beam, the projection lens being disposed on a transmission path of the image light beam to project the image light beam, the illumination system comprising an excitation light source and a wavelength conversion element, wherein:

the excitation light source is adapted to provide an excitation light beam, the wavelength conversion element is located on a transmission path of the excitation light beam and comprises a substrate, a wavelength conversion layer and a fixed ring, the wavelength conversion layer is disposed on the substrate, the fixed ring is disposed on the substrate, the fixed ring has a first surface, a second surface, and a plurality of flow guiding structures, the first surface is opposite to the second surface, the second surface faces the substrate, the second surface has a first region and a second region adjacent to the first region, the first region is fixed to the substrate, the second region is separated from the substrate to form a flow guiding space, each of the plurality of flow guiding structures is located on the first surface, each of the plurality of flow guiding structures is formed with a first flow guiding hole, the first flow guiding hole extends from the first surface to the second region of the second surface, each of the plurality of flow guiding structures has a spoiler surface, the spoiler surface protrudes from the first surface and has a second flow guiding hole, wherein the second flow guiding hole and the first flow guiding hole of each of the plurality of flow guiding structures face different directions; and the substrate further has a bearing surface and a back surface opposite to the bearing surface, the wavelength conversion layer is disposed on the bearing surface, and the fixed ring is disposed on the bearing surface.

* * * * *